C. M. BAKER.
GATE.
APPLICATION FILED OCT. 15, 1912.

1,078,236.

Patented Nov. 11, 1913.

2 SHEETS—SHEET 1.

Witnesses

C. M. Baker, Inventor by C. A. Snow & Co., Attorneys

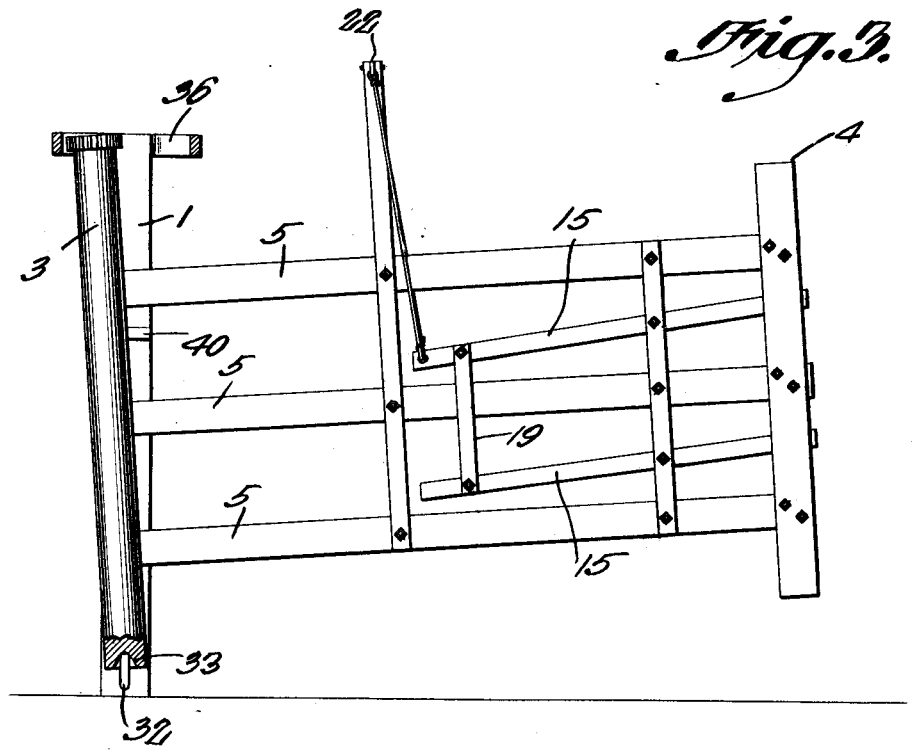

UNITED STATES PATENT OFFICE.

CLIFFORD M. BAKER, OF MASON CITY, IOWA.

GATE.

1,078,236.  Specification of Letters Patent.  Patented Nov. 11, 1913.

Application filed October 15, 1912.   Serial No. 725,958.

*To all whom it may concern:*

Be it known that I, CLIFFORD M. BAKER, a citizen of the United States, residing at Mason City, in the county of Cerro Gordo and State of Iowa, have invented a new and useful Gate, of which the following is a specification.

One object of the present invention is to provide a gate which may be opened readily from either side of the gate, by a person in a vehicle or upon horse-back.

Another object of the invention is to provide means whereby a gate, when the same is swung, will be tilted and elevated, so as to gravitate, when released, into closed position.

With the foregoing and other objects in view which will appear as the description proceeds, the invention resides in the combination and arrangement of parts and in the details of construction hereinafter described and claimed, it being understood that changes in the precise embodiment of invention can be made within the scope of what is claimed without departing from the spirit of the invention.

Figure 1:
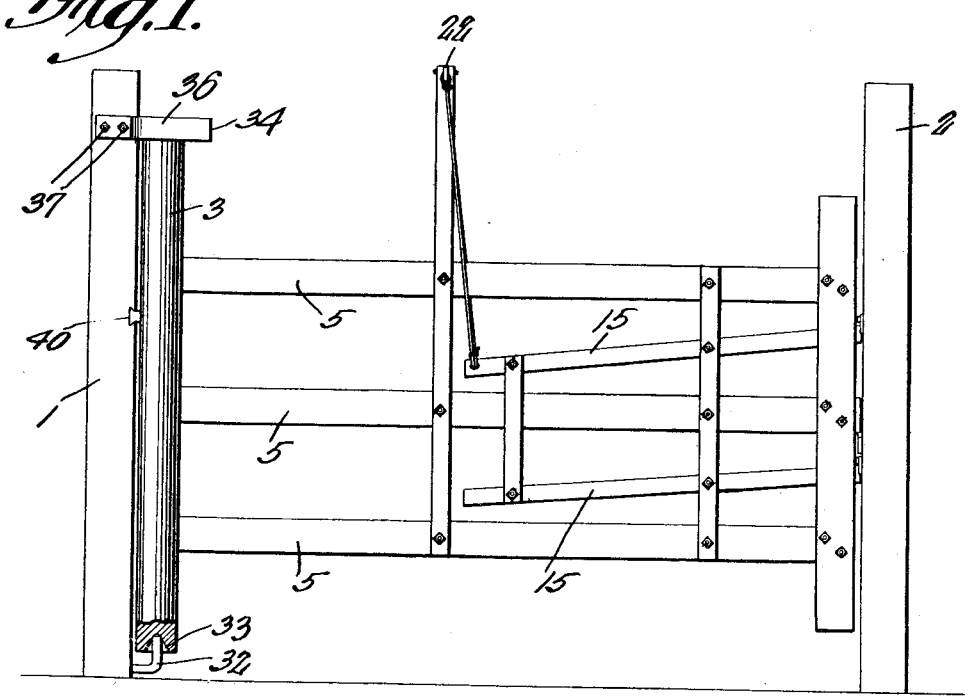
Figure 2:
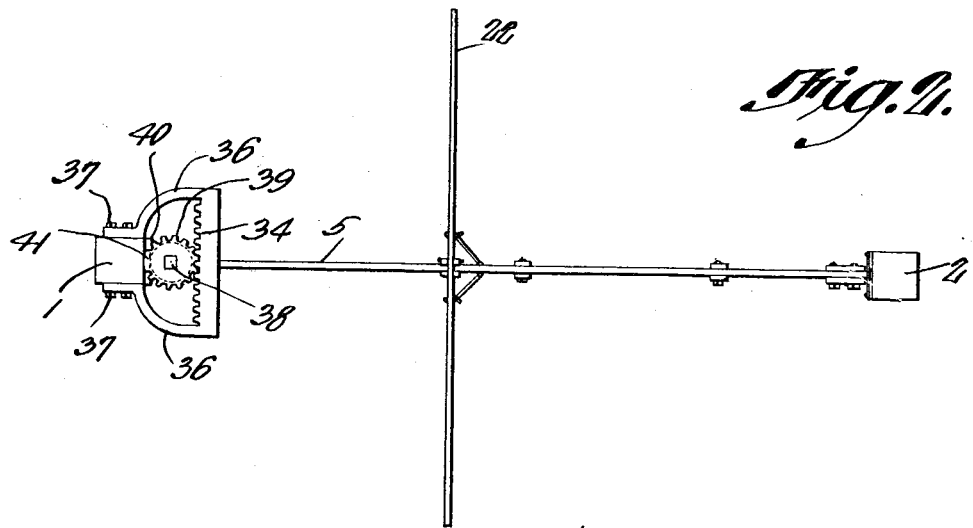

In the drawing:—Figure 1 shows the invention in front elevation; Fig. 2 is a top plan; and Fig. 3 is a side elevation, showing the gate swung into an open position.

In carrying out the invention there is provided a support 1 the same preferably taking the form of post, a fixed support 2 being provided, the same preferably being a striking post.

The gate proper comprises an inner post 3 gate bars 5 and a pair of latches 15 controlled by a lever 22. The latches 15 engage the striking post 2. Projecting from the support 1 is a gudgeon 32, received in a conical recess 33 formed in the lower end of the circular post 3. A rack 34 is provided, the teeth of which project toward the support 1, the rack 34 being provided with arms 36, securing elements 37 being employed for connecting the extremities of the arms 36 with the support 1. The upper end of the inner post 3 of the gate is squared, as shown at 38, to hold against rotation, a pinion 39, the pinion 39 meshing into the teeth of the rack 34. Extended transversely of the support 1 and dove-tailed thereinto, or otherwise secured thereon, is an arm 40. The arm 40 bears against the rear edge of the rounded post 3 of the gate, so as to hold the teeth of the pinions 39 in mesh with the teeth of the rack.

Presupposing that the parts are positioned as shown in Fig. 1, the operation of the device is as follows: When the gate is swung into an open position, the pinion 39 will travel along the teeth of the rack 34, the upper edge of the gate being swung, to dispose the gate out of a vertical position. At the same time, the gate will be lifted vertically, into the inclined position shown in Fig. 3, the construction being such that when the gate is released, the gate will gravitate to a closed position.

In order that the gate may gravitate into a closed position and may engage with the striking post 2, it is necessary that the rotary movement of the inner post 3 be limited. To this end, the pinion 39, as clearly shown in Fig. 2, is provided upon its periphery with a projection lug 41, adapted to engage the teeth of the rack 34. Owing to the presence of the projection 41, the gate, in its swinging movement, in either direction, never crosses a line which is tangent to the ends of the teeth of the rack 34.

Having thus described the invention, what is claimed is:—

1. A device of the class described comprising as constituent parts, a support and a rack secured to the upper portion of the support, the rack having teeth projecting toward the support; a gate; means for pivoting the lower portion of the gate to the support; a pinion fixed to the gate and meshing in its forward portion into the teeth of the rack; and a fixed member mounted upon the support and bearing against that edge of the gate which is adjacent the support, said member constituting means for holding said forward portion of the pinion meshed with the rack and also constituting means for spacing the rear portion of the pinion from one of said constituent parts.

2. In a device of the class described, a support; a frame secured to the support and provided between its ends with a rack; a gate; and a pinion on the gate, the pinion meshing into the rack, the pinion having an enlarged tooth adapted to engage the rack to limit the swinging movement of the gate and to prevent those teeth of the pinion which have a working mesh with the rack from striking the ends of the frame.

In testimony that I claim the foregoing as my own, I have hereto affixed my signature in the presence of two witnesses.

CLIFFORD M. BAKER.

Witnesses:
H. V. BANE,
C. W. BARTEN.

Copies of this patent may be obtained for five cents each, by addressing the "Commissioner of Patents, Washington, D. C."